United States Patent
Kämmerer

(10) Patent No.: US 7,300,107 B2
(45) Date of Patent: Nov. 27, 2007

(54) VEHICLE SEAT HAVING A FLAT FLOOR POSITION

(75) Inventor: Joachim Kämmerer, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 134 days.

(21) Appl. No.: 11/195,169

(22) Filed: Aug. 2, 2005

(65) Prior Publication Data

US 2006/0033373 A1 Feb. 16, 2006

(30) Foreign Application Priority Data

Aug. 13, 2004 (DE) .................. 10 2004 039 249

(51) Int. Cl.
*B60N 2/00* (2006.01)
*B60N 2/02* (2006.01)

(52) U.S. Cl. .................. 297/336; 297/334; 297/335; 296/65.09; 296/65.01

(58) Field of Classification Search ............. 297/334, 297/335, 336; 296/69.05, 65.09, 65.01
See application file for complete search history.

(56) References Cited

U.S. PATENT DOCUMENTS

| 4,699,418 | A |   | 10/1987 | Plavetich |   |
|---|---|---|---|---|---|
| 4,957,321 | A | * | 9/1990 | Martin et al. ............. | 296/65.09 |
| 5,588,707 | A | * | 12/1996 | Bolsworth et al. ..... | 297/378.12 |
| 6,000,742 | A | * | 12/1999 | Schaefer et al. ......... | 296/65.09 |
| 6,595,588 | B2 |   | 7/2003 | Ellerich et al. |   |
| 6,648,392 | B2 | * | 11/2003 | Fourrey et al. .......... | 296/65.09 |
| 6,655,738 | B2 |   | 12/2003 | Kammerer |   |
| 6,676,216 | B1 |   | 1/2004 | Freijy et al. |   |
| 6,817,669 | B2 |   | 11/2004 | Roth et al. |   |
| 6,902,236 | B2 | * | 6/2005 | Tame ......................... | 297/335 |
| 7,014,263 | B2 | * | 3/2006 | Mukoujima et al. ........ | 297/341 |
| 2001/0050502 | A1 | * | 12/2001 | Fourrey et al. ............. | 297/331 |
| 2002/0125753 | A1 |   | 9/2002 | Kammerer |   |

FOREIGN PATENT DOCUMENTS

| DE | 101 56 644 A1 | 6/2003 |
|---|---|---|
| GB | 2 386 549 A | 9/2003 |
| WO | WO 02/22391 A1 | 3/2002 |

* cited by examiner

*Primary Examiner*—S. B. McPartlin
(74) *Attorney, Agent, or Firm*—Womble Carlyle Sandridge & Rice, PLLC

(57) ABSTRACT

In the case of a vehicle seat (1), in particular a motor vehicle seat, having at least one front foot (11), at least one rear foot (21) coupled to the front foot (11), a seat cushion (3) coupled at least to the front foot (11), a backrest (5) coupled to the rear foot (21), and a coupling between the seat cushion (3) and the backrest (5), it is possible for the vehicle seat (1) to be transferred at least from at least one use position suitable for conveying people into a folded-up flat floor position, the coupling between the seat cushion (3) and the backrest (5) is provided by at least two members (41, 45) which are movably connected to each other and of which at least one is coupled to the rear foot (21) by means of a central joint (43).

21 Claims, 3 Drawing Sheets

VEHICLE SEAT HAVING A FLAT FLOOR POSITION

BACKGROUND OF THE INVENTION

The present invention relates to a vehicle seat, in particular a motor vehicle seat, having at least one front foot, at least one rear foot coupled to the front foot, a seat cushion coupled at least to the front foot, a backrest coupled to the rear foot, and a coupling between the seat cushion and the backrest, wherein it is possible for the vehicle seat to be transferred at least from at least one use position, which is suitable for conveying people, into a folded-up flat floor position.

The second and/or third seat rows of multifunction vehicles (MPV), such as, for example, vans or large-capacity sedans, are generally configured in such a manner that the interior space can be set in a variable manner to transporting people or goods. For example, U.S. Pat. No. 6,655,738 discloses a known vehicle seat of the type mentioned above, which can be transferred from a use position into a position suitable for entry or into a folded-up flat floor position to enlarge the storage capacity for goods. In this known vehicle seat, a connecting rod is provided between the seat cushion and the backrest.

BRIEF SUMMARY OF SOME ASPECTS OF THE INVENTION

An aspect of the present invention is the provision of an alternative to the vehicle seat mentioned immediately above.

In accordance with one aspect of the present invention, a vehicle seat, in particular motor vehicle seat, has at least one front foot, at least one rear foot coupled to the front foot, a seat cushion coupled at least to the front foot, a backrest coupled to the rear foot, and a coupling between the seat cushion and the backrest. In accordance with this aspect, it is possible for the vehicle seat to be transferred at least from at least one use position, which is suitable for conveying people, into a folded-up flat floor position. Further in accordance with this aspect, the coupling between the seat cushion and the backrest is provided by at least two members that are movably connected to each other for transmitting force, and at least one of the two members is coupled to the rear foot by means of an at least substantially central joint.

Because the coupling between the seat cushion and the backrest is provided by at least two members which are movably connected to each other for transmitting force and of which at least one is coupled to the rear foot by means of an at least substantially central joint, the coupling can be optimally adapted to a predetermined geometry in which the degrees of freedom existing during a coupled movement of the backrest and seat cushion are at the same time reduced to such an extent that a defined movement takes place.

The members provided for the coupling preferably form parts of four-bar linkages which preferably define a sequence in the drive, which sequence ultimately leads, during a folding over forward of the backrest, to a lowering of the seat cushion. In this case, a rocker (e.g., a pivotably mounted bar) is preferably designed as a two-armed lever, the various arms of which belong to various four-bar linkages, which reduces the number of components and simplifies the installation and the sequence of movement. In order to increase the seating comfort, the backrest is preferably adjustable in inclination. If the backrest can also be folded rearward, the same four-bar linkages, which lead to a lowering of the seat cushion when the backrest is folded over forward, permit a raising of the seat cushion, preferably to the same height as the backrest in order to obtain a reclining surface of continuously identical height.

The vehicle seat can preferably also be transferred from the use position into an entry position, which permits a versatile use in various seat rows, in particular also in a second seat row next to a vehicle door. In order for the folded-up vehicle seat to be as small as possible in the longitudinal direction of the vehicle in the entry position, the rear foot pivots forward and, owing to the coupling to the front foot, also upward. In the process, it swings the seat cushion up at the rear end preferably by means of the rocker (e.g., the pivotably mounted bar), with the result that the seat surface and backrest surface both face approximately forward. By means of a lock, or the like, the rear foot is preferably locked to the front foot for securing purposes. It is preferred for this same lock, or the like, to be used in the use position for the base-fixed locking of the rear foot, i.e. the fastening of the rear foot to the vehicle floor.

The vehicle seat preferably has a removal function by, for example, the front foot being detachable in the entry position or all of the feet being detachable in the use position. In the case of longitudinally adjustable vehicle seats, the feet are preferably detached from the rails which remain in the vehicle.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which.

DETAILED DESCRIPTION OF EXEMPLARY EMBODIMENT

Figure 1:
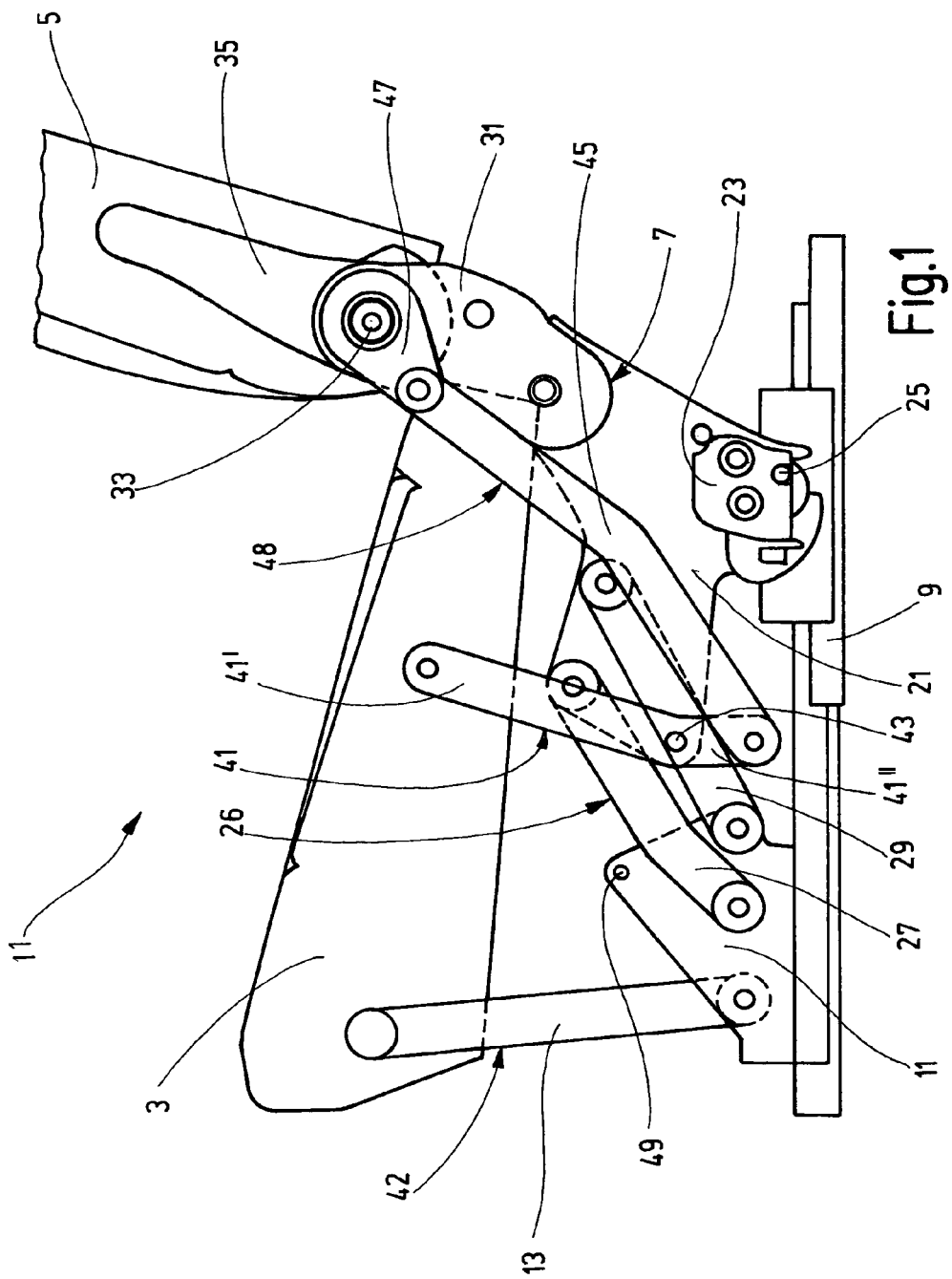
FIG. 1 shows a side view, illustrated in partially cutaway form, of the exemplary embodiment in the use position.
Figure 2:
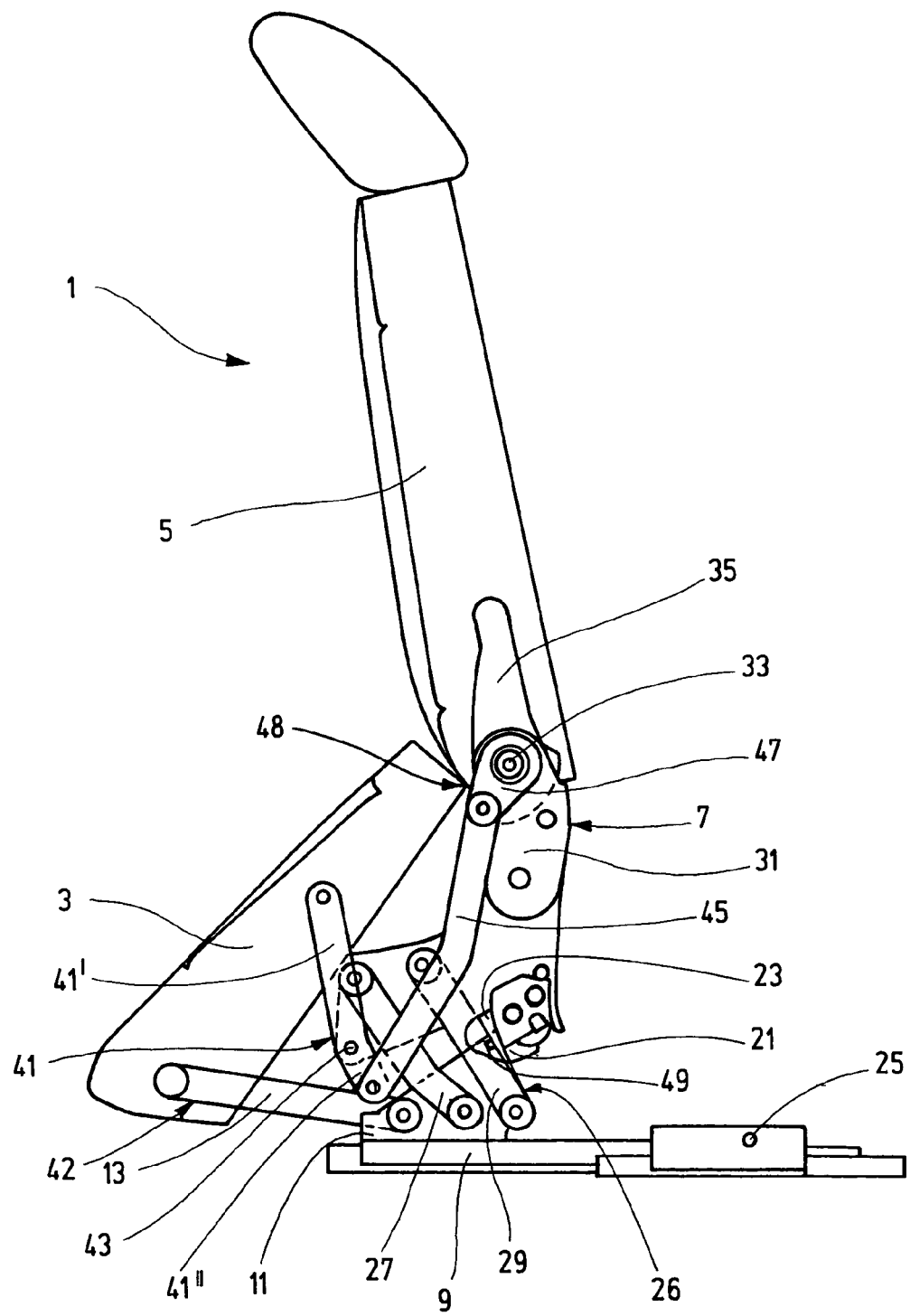
FIG. 2 shows an illustration corresponding to FIG. 1 in the entry position.
Figure 3:
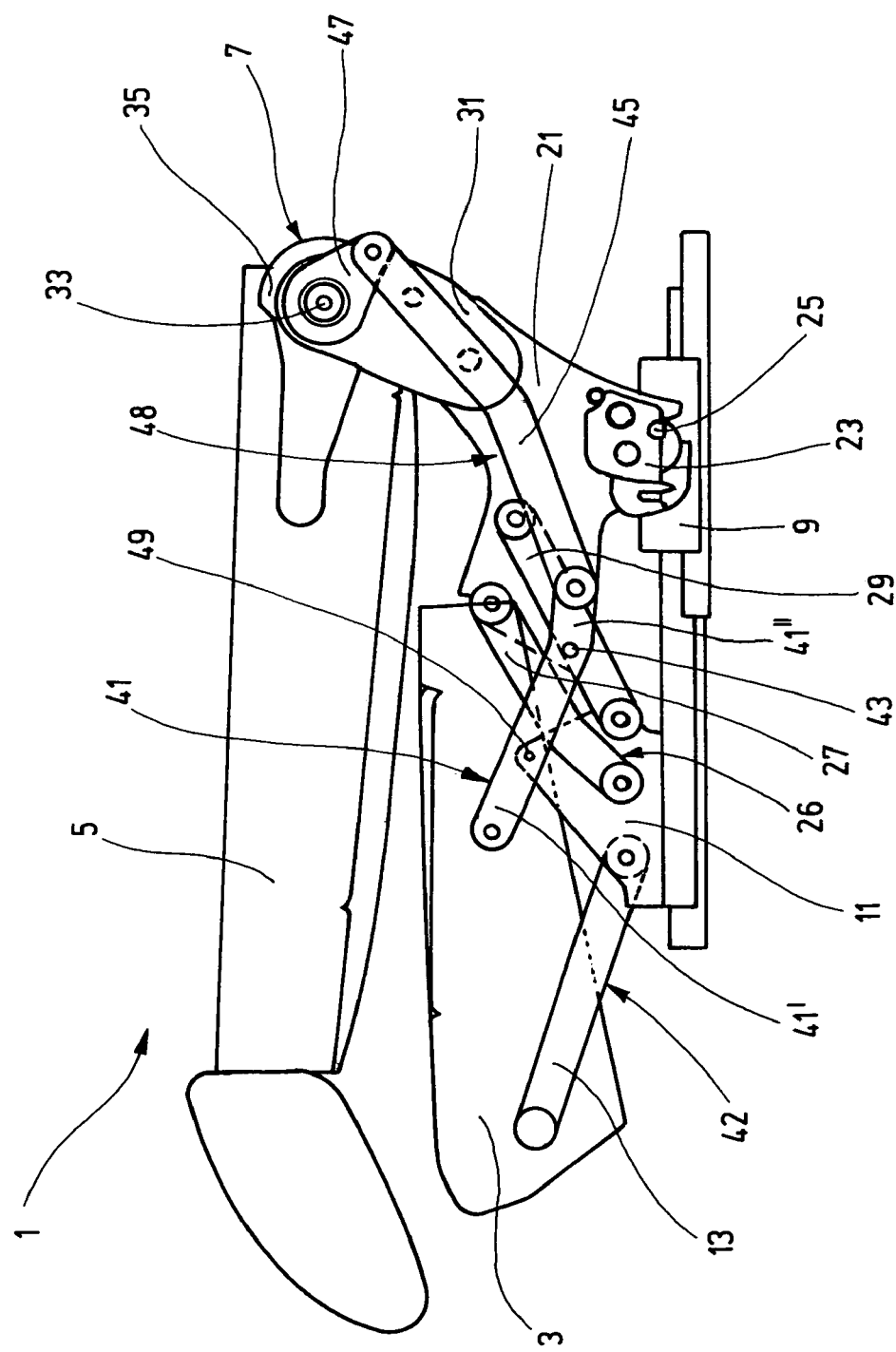
FIG. 3 shows an illustration corresponding to FIG. 1 in the flat floor position.

A vehicle seat 1 for a central or rear seat row of a motor vehicle, for example a van, has a seat cushion 3 and a backrest 5 which can be adjusted in its inclination relative to the seat cushion 3 by means of fittings 7. The following directional details assume that the vehicle seat 1 is arranged in the motor vehicle in the forward direction of travel. In a use position of the vehicle seat 1 that is suitable for conveying people (i.e., in which the vehicle seat is suitable for being sat in), the backrest 5 is situated at the rear end of the seat cushion 3. The term seat cushion 3 is to be understood as meaning the entire subassembly comprising a structure and a related padding. If components are coupled to the seat cushion 3, this is to be understood as meaning a coupling to the structure of the seat cushion 3.

For the sake of simplicity, only the left side of the essentially symmetrical vehicle seat 1 is described below, to be precise first of all in a special use position, namely the design position, in which the backrest 5 is inclined rearward by, for example, 23 degrees with respect to the vertical. A front foot 11 is attached, preferably detachably by means of a lock or the like, to a base 9. The base is connected to the structure of the motor vehicle. More specifically, the base 9 is, in accordance with the exemplary embodiment, connected to a pair of seat rails so that the vehicle seat 1 is longitudinally adjustable. The seat cushion 3 is coupled to the front foot 11 by means of a front rocker 13. In accordance with the exemplary embodiment of the present invention, the front rocker 13 is a pivotably mounted bar. The front rocker 13 is provided at its opposite ends with joints of which one forms the coupling to the front foot 11 and the other forms the coupling to the front end of the seat cushion 3.

Also arranged on the base 9, behind the front foot 11 with respect to the direction of travel, is a rear foot 21. The rear foot 21 is locked releasably to the base 9 (fixed on the base) by a lock 23 which is attached to the rear foot 21. The lock 23 is for being locked releasably to a fastening bolt 25 fixed on the base. In addition, the rear foot 21 is coupled to the front foot 11 by means of a rear-foot four-bar linkage 26. The four members of the rear-foot four-bar linkage 26 are a first link 27, a second link 29, the front foot 11, and the rear foot 21. The second link 29 is arranged behind the first link 27 in the direction of travel. The first and second links 27, 29 each have joints at both of their ends. The lower part 31 of the fitting 7 is also attached to the rear foot 21. The upper part 35 of the fitting 7 is fastened to the backrest 5. The upper part 35 of the fitting 7 can be pivoted about the backrest pivot axis 33 relative to the fitting lower part 31 and can be locked to the fitting lower part 31.

A rear rocker 41 (e.g., pivotably mounted bar) is designed as a two-armed lever and is coupled directly to the rear foot 21 by means of a central joint 43 (e.g., an at least substantially central joint) situated between the two arms. The longer first arm 41' of the rear rocker 41 is coupled at its end to the seat cushion 3, to be precise toward the rear end of the seat cushion 3, approximately at two thirds of the length of the seat cushion 3, as measured from the front. The longer first arm 41' of the rear rocker 41 extends upward from the central joint 43 in the use position. The base 9 with the feet 11 and 21, the two rockers 13 and 41 and the seat cushion 3 are the four members that define a cushion four-bar linkage 42. A connecting rod 45 is coupled at one end by means of a further joint to the shorter, second arm 41" of the rear rocker 41. The connecting rod 45 is coupled at its other end by means of a joint there to a third arm 47. The shorter, second arm 41" of the rear rocker 41 extends downward from the central joint 43 in the use position. The third arm 47 is connected in a rotationally fixed manner to the fitting upper part 35. In a modified embodiment, the connecting rod 45 could also be coupled to another part of the backrest 5.

During the adjustment of the inclination of the backrest 5, the fitting 7 on each side of the vehicle seat is unlocked, the backrest 5 is pivoted about the backrest pivot axis 33 into the desired position, and then each fitting 7 is locked again. In this case, the rear foot 21 with the fitting lower part 31, the third arm 47, the connecting rod 45 and the second arm 41" are the four members that form a connecting-rod four-bar linkage 48 which forces the rear rocker 41 into a pivoting movement about the central joint 43, i.e. moves the cushion four-bar linkage 42. As a result, the inclination of the seat cushion 3 also changes, to be precise, is first of all steeper when the backrest 5 is pivoted forward and is flatter when the backrest 5 is pivoted back.

In order to transfer the vehicle seat 1 into an entry position as an advantageous not-in-use position, the rear foot 21 is unlocked on both sides, put more precisely the lock 23 thereof is unlocked, with the result that the latter releases the fastening bolt 25. The rear foot 21 now pivots upward and forward by means of the rear-foot four-bar linkage 26, i.e. the links 27 and 29. This pivoting movement of the rear foot 21 about the front foot 11 is, when considered precisely, a combining of a plurality of pivoting movements of the components involved about the coupling points of the rear-foot four-bar linkage 26. The fitting 7 remains locked in each case. As a result, the connecting rod 45 and, as a consequence thereof, also the rear rocker 41, are in a rigid arrangement relative to the rear foot 21. The rear foot 21 therefore uses the rear rocker 41 to push the seat cushion 3 so that the rear end of the seat cushion moves upward. The seat cushion's front end is coupled to the front rocker 13, so that the seat cushion 3 pivots downward, i.e. is overall set upright with the seat surface in front. By contrast, the backrest 5 is inclined slightly forward. When the entry position is reached, in which the access to a rear seat row is facilitated, the lock 23 or another catch arrangement is locked to a securing bolt 49 of the front foot 11, i.e. the rear foot 21 and the front foot 11 are locked to each other. The return into the previously occupied use position takes place, after the above-discussed locking between the feet 11 and 21 is released, in the reverse sequence of the steps described above. As an alternative, in the entry position, the front foot 11 can be released on both sides and the vehicle seat 1 can be removed as a whole.

In order to transfer the vehicle seat 1 into a flat floor position, as a further advantageous not-in-use position, in which an enlarged storage space is available for receiving goods, the backrest 5 is folded forward after the fitting 7 is unlocked. As in the case of the adjustment of the inclination, the connecting-rod four-bar linkage 48 forces the rear rocker 41 into a pivoting movement about the central joint 43 and therefore moves the cushion four-bar linkage 42 and initially sets the seat cushion 3 in a steeper position. However, the connecting rod 45 passes through a dead-center position in which the joints of the connecting rod 45 and the backrest pivot axis 33 lie on a line, after which the connecting-rod four-bar linkage 48, by movement of the rear rocker 41 forward, begins to lower the cushion four-bar linkage 42 and therefore the seat cushion 3. As the flat floor position is approached, in which the rear side of the backrest 5 is at least approximately horizontal, the backrest 5 is placed onto (e.g., overlies) the seat cushion 3. This folded-up flat floor position is secured by the fitting 7 being locked. The return into the previously occupied use position takes place, after the fitting 7 is unlocked, in a reverse sequence of the steps described above.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A vehicle seat, comprising:
   at least one front foot;
   at least one rear foot coupled to the front foot;
   a seat cushion coupled at least to the front foot;
   a backrest coupled to the rear foot; and
   a coupling between the seat cushion and the backrest, wherein
   the coupling between the seat cushion and the backrest is operative for allowing the vehicle seat to be transferred at least from at least one use position, in which the vehicle seat is suitable for being sat in, to a folded-up flat floor position,
   the coupling between the seat cushion and the backrest includes at least two members that are movably connected to each other for transmitting force,
   a first of the two members is (a) coupled to the rear foot by a first joint,
(b) coupled to the seat cushion by a second joint, and
(c) coupled to a second of the two members by a third joint, the first of the two members is a pivotably mounted bar,
the bar is part of a cushion four-bar linkage,
the second of the two members is a connecting rod,
the connecting rod is part of a connecting-rod four-bar linkage,
the connecting-rod four-bar linkage is driven by the backrest during the transfer from the use position into the flat floor position,
the connecting-rod four-bar linkage, which is driven by the backrest, drives the cushion four-bar linkage, which lowers the seat cushion, the bar is a multi-armed lever, the multi-armed lever includes a first arm and a second arm, the first arm is part of the cushion four-bar linkage, and the second arm is part of the connecting-rod four-bar linkage.

2. The vehicle seat as claimed in claim 1, wherein the third joint is an at least substantially central joint that is positioned between the first arm and the second arm.

3. The vehicle seat as claimed in claim 2, wherein:
the vehicle seat is operative for being transferred from the use position into an entry position;
the rear foot is pivoted forward during the transfer of the vehicle seat from the use position to the entry position; and
the rear foot causes, by way of the bar, the seat cushion's rear end to pivot upward while the rear foot is pivoted forward during the transfer of the vehicle seat from the use position to the entry position.

4. The vehicle seat as claimed in claim 1, wherein the vehicle seat is operative for being transferred from the use position into an entry position.

5. The vehicle seat as claimed in claim 4, wherein the rear foot is pivoted forward during the transfer of the vehicle seat from the use position to the entry position.

6. The vehicle seat as claimed in claim 1, wherein the rear foot being coupled to the front foot comprises the rear foot being coupled to the front foot by way of a rear-foot four-bar linkage.

7. The vehicle seat as claimed in claim 1, wherein:
during the use position
(a) the seat cushion extends at least about generally horizontally, and
(b) the backrest extends upright from proximate a rear of the seat cushion; and during the folded-up flat floor position
(a) each of the seat cushion and the backrest extends at least about generally horizontally, and
(b) the backrest overlies the seat cushion.

8. The vehicle seat as claimed in claim 2, wherein:
the bar includes opposite ends, and
the at least substantially central joint is positioned between, and distant from, each of the opposite ends.

9. The vehicle seat as claimed in claim 8, wherein the at least substantially central joint is not equidistant between the opposite ends.

10. A vehicle seat, comprising:
at least one front foot;
at least one rear foot coupled to the front foot;
a seat cushion coupled at least to the front foot;
a backrest coupled to the rear foot; and
a coupling between the seat cushion and the backrest, wherein the coupling between the seat cushion and the backrest is operative for allowing the vehicle seat to be transferred at least from at least one use position, in which the vehicle seat is suitable for being sat in, to a folded-up flat floor position,
the coupling between the seat cushion and the backrest includes at least two members that are movably connected to each other for transmitting force,
at least one of the two members is coupled to the rear foot by way of an at least substantially central joint,
at least one of the two members is a pivotably mounted bar,
the bar is coupled to the seat cushion and forms part of a cushion four-bar linkage
the bar is a multi-armed lever,
the multi-armed lever includes a first arm and a second arm,
the first arm is part of the cushion four-bar linkage,
the second arm is part of a connecting-rod four-bar linkage,
the connecting-rod four-bar linkage is driven by the backrest during the transfer from the use position into the flat floor position, and
the at least substantially central joint is positioned between the first arm and the second arm.

11. The vehicle seat as claimed in claim 10, wherein:
during the use position
(a) the seat cushion extends at least about generally horizontally, and
(b) the backrest extends upright from proximate a rear of the seat cushion; and during the folded-up flat floor position
(a) each of the seat cushion and the backrest extends at least about generally horizontally, and
(b) the backrest overlies the seat cushion.

12. The vehicle seat as claimed in claim 10, wherein the vehicle seat is operative for being transferred from the use position into an entry position.

13. The vehicle seat as claimed in claim 12, wherein the rear foot is pivoted forward during the transfer of the vehicle seat from the use position to the entry position.

14. The vehicle seat as claimed in claim 12, wherein during the entry position:
the seat cushion is inclined so that a rear of the seat cushion is at a higher elevation than a front of the seat cushion, and
the backrest extends upright from proximate the rear of the seat cushion.

15. A vehicle seat, comprising:
at least one front foot;
at least one rear foot coupled to the front foot;
a seat cushion coupled at least to the front foot;
a backrest coupled to the rear foot; and
a coupling between the seat cushion and the backrest, wherein
the coupling between the seat cushion and the backrest is operative for allowing the vehicle seat to be transferred at least from at least one use position, in which the vehicle seat is suitable for being sat in, to
(a) a folded-up flat floor position, and
(b) an entry position,
the coupling between the seat cushion and the backrest includes at least two members that are movably connected to each other for transmitting force,
a first of the two members is
(a) coupled to the rear foot by a first joint,
(b) coupled to the seat cushion by a second joint, and (c) coupled to a second of the two members by a third joint, the first of the two members is a pivotably mounted bar, the bar is part of a cushion four-bar linkage, the second of the two members is a connecting rod, the connecting rod is part of a connecting-rod four-bar linkage, the connecting-rod four-bar linkage is driven by the backrest during the transfer from the use position into the flat floor position, the connecting-rod four-bar linkage, which is driven by the backrest, drives the cushion four-bar linkage, which lowers the seat cushion during the transfer from the use position into the flat floor position, and the rear foot is pivoted forward during the transfer of the vehicle seat from the use position to the entry position.

16. The vehicle seat as claimed in claim 15, wherein during the use position:

the seat cushion extends at least about generally horizontally, and the backrest extends upright from proximate a rear of the seat cushion.

17. The vehicle seat as claimed in claim 15, wherein:

the bar is a multi-armed lever, the multi-armed lever includes a first arm and a second arm, the first arm is part of the cushion four-bar linkage, and the second arm is part of the connecting-rod four-bar linkage.

18. The vehicle seat as claimed in claim 15, wherein the rear foot being coupled to the front foot comprises the rear foot being coupled to the front foot by way of a rear-foot four-bar linkage.

19. The vehicle seat as claimed in claim 15, wherein:

the rear foot causes, by way of the bar, the seat cushion's rear end to pivot upward while the rear foot is pivoted forward during the transfer of the vehicle seat from the use position to the entry position.

20. The vehicle seat as claimed in claim 15, wherein during the entry position:

the seat cushion is inclined so that a rear of the seat cushion is at a higher elevation than a front of the seat cushion, and the backrest extends upright from proximate the rear of the seat cushion.

21. The vehicle seat as claimed in claim 20, wherein the rear foot being coupled to the front foot comprises the rear foot being coupled to the front foot by way of a rear-foot four-bar linkage.

* * * * *